US012250435B2

United States Patent
Schaeffer et al.

(10) Patent No.: US 12,250,435 B2
(45) Date of Patent: *Mar. 11, 2025

(54) SELECTION AND PROVISION OF DIGITAL COMPONENTS DURING DISPLAY OF CONTENT

(71) Applicant: Google LLC, Mountain View, CA (US)

(72) Inventors: Benjamin James Schaeffer, Brooklyn, NY (US); Matthew Stephen Ross, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,915

(22) Filed: Mar. 19, 2024

(65) Prior Publication Data

US 2024/0223866 A1    Jul. 4, 2024

Related U.S. Application Data

(63) Continuation of application No. 17/925,622, filed as application No. PCT/US2021/025502 on Apr. 2, 2021, now Pat. No. 11,974,023.

(60) Provisional application No. 63/134,921, filed on Jan. 7, 2021.

(51) Int. Cl.
*H04N 21/81* (2011.01)
*H04N 21/85* (2011.01)

(52) U.S. Cl.
CPC ............ *H04N 21/81* (2013.01); *H04N 21/85* (2013.01)

(58) Field of Classification Search
None
See application file for complete search history.

(56) References Cited

U.S. PATENT DOCUMENTS

2013/0254802 A1*  9/2013  Lax ............... H04N 21/435
                                                    725/34

FOREIGN PATENT DOCUMENTS

| JP | 2018-088296 | 6/2018 |
| JP | 2020-501396 | 1/2020 |
| JP | 2020-528680 | 9/2020 |
| JP | 2021-530758 | 11/2021 |
| WO | WO 2018148749 | 8/2018 |

(Continued)

OTHER PUBLICATIONS

International Search Report and Written Opinion in International Appln. No. PCT/US2021/025502, mailed on Oct. 1, 2021, 13 pages.

(Continued)

*Primary Examiner* — Nicholas T Corbo
(74) *Attorney, Agent, or Firm* — Fish & Richardson P.C.

(57) ABSTRACT

Methods, systems, and apparatus, including computer programs encoded on a computer storage medium, for the selection, provision and display of one or more digital components during display of content. Methods can include identifying a plurality of digital components that can be presented on the client device. A maximum number of digital components that can be presented in a slot of a content and the time duration of the slot is determined. For each digital component a score is generated based on the duration, a position requirement and the number of times the digital component is available for provision within the slot is generated. A first set of digital component is selected based on the scores and provided to the client device.

20 Claims, 4 Drawing Sheets

(56) References Cited

FOREIGN PATENT DOCUMENTS

WO  WO-2018148749 A1 *  8/2018  ............. G06F 16/45

OTHER PUBLICATIONS

Notice of Allowance in Japanese Appln. No. 2022-572760, mailed on May 27, 2024, 5 pages (with English translation).
Office Action in Japanese Appln. No. 2022-572760, mailed on Feb. 5, 2024, 6 pages (with English translation).

* cited by examiner

SELECTION AND PROVISION OF DIGITAL COMPONENTS DURING DISPLAY OF CONTENT

BACKGROUND

This application is a continuation of U.S. patent application Ser. No. 17/925,622 filed Nov. 16, 2022, which is a National Stage Application under 35 U.S.C. § 371 and claims the benefit of International Application No. PCT/US2021/025502, filed Apr. 2, 2021, which claims priority to U.S. Provisional Application No. 63/134,921, filed Jan. 7, 2021, entitled SELECTION AND PROVISION OF DIGITAL COMPONENTS DURING DISPLAY OF CONTENT, the disclosure of which is incorporated herein by reference.

This specification relates to data processing, and in particular, to the selection and provision of one or more digital components for provision during display of content.

The Internet provides access to digital content such as a video clip, an audio clip or a multimedia clip that are provided by a content distribution system (e.g., a search platform, a social media platform, or another platform that hosts digital contents). Users can use applications (e.g., a web browser, a native application) executing on client devices such as smartphones, tablets and personal computers to view such digital content.

The content distribution system can also provide digital components (e.g., digital content that is not part of, or originally included in the digital content) for presentation on the client device during presentation of the digital content. For example, the digital content (e.g., a video clip) can be temporarily paused for one or more time intervals during its presentation and during each of these time intervals (referred to as a slot), one or more digital components provided by the digital component system can be presented on the client device. The presentation of the digital content can be resumed after the digital components have been completely presented or after a duration of the slot has elapsed.

SUMMARY

In general, one innovative aspect of the subject matter described in this specification can be embodied in methods including the operations of identifying a plurality of digital components; determining (i) a maximum number of digital components N that can be provided in a slot of a particular content and (ii) a time T specifying a total duration of the slot, wherein the slot is a location within the particular content at which one or more digital components can be provided; for each digital component in the plurality of digital components, generating a score based on (i) a duration of the digital component, (ii) a position requirement for the digital component that specifies whether the digital component is required to be provided in a particular position from among M available positions in the slot, wherein each available position spans a particular duration of the particular content and within which a single digital component can be provided for presentation, and (iii) a number of times that the digital component is available for provision within the slot; selecting, from the plurality of digital components and based on the scores for the plurality of digital components, a first set of digital components having a set of highest scores for provision within the slot; and providing the first set of digital components for provision within the slot during display of the particular content on a client device.

Other embodiments of this aspect include corresponding methods, apparatus, and computer programs, configured to perform the actions of the methods, encoded on computer storage devices. These and other embodiments can each optionally include one or more of the following features.

Methods can further include generating the score based on (i) a priority value that is assigned to the digital component, wherein the priority value signifies an importance of providing the digital component to the client device and (ii) a satisfaction ratio that represents a number of digital components of a particular duration that have previously been provided for display to client devices relative to a total number of digital components of the particular that are available for provision to client devices.

Methods can include determining the number of times that the digital component is available for provision within the slot is based on (i) the maximum number of digital components N, (ii) the time T specifying the total duration of the slot, and (iii) the position requirement for the digital component. Methods can include M sequential positions.

Methods can include generating the score based on (i) the duration of the digital component, (ii) the position requirement for the digital component, and (iii) the number of times that the digital component can be provided within the N available positions, comprises: grouping digital components into multiple classes based on the duration of the digital components; determining a position requirement for each of the multiple classes, wherein the position requirement for each class specifies a particular position of the slot at which a digital component of the class is to be provided for display; determining, for each class and based on (i) the maximum number of digital components N that can be provided in a slot, (ii) the time T specifying the a total duration of the slots, and (iii) the position requirement for the class, a number of times a digital component from each class can be provided for display within the slot; computing a duration factor for each class as the reciprocal of the number of times a digital component from the class can be included in the slot; and generating the score for each digital component in the plurality of digital components based on (i) the priority value, (ii) the satisfaction ratio, and (iii) the computed duration factor for the class to which the digital component belongs.

Methods can include identifying a plurality of classes of digital components of different durations, wherein each class represent a group of digital components of a particular duration; for each class: determining a target number of digital components that are to be provided to client devices; determining a number of digital components that have previously been provided for display to client devices; computing a ratio based on the target number and the number of digital components that have previously been provided for display to client devices; and generating the satisfaction index based on the computed ratios for the plurality of classes.

Particular embodiments of the subject matter described in this specification can be implemented to realize one or more of the following advantages. As described above, a content distribution system selects and delivers digital components to client devices. In general, digital components provided to client devices can vary in their respective time durations. Some existing techniques for selecting and providing digital components seek to maximize the total number of digital components that are selected and provided to the client devices for display within a slot (as described further below), which generally results in a bias towards selection and provision of digital components with shorter duration (relative to other digital components) resulting in a disproportionate selection and delivery of digital components. For example, when digital components are being provided for a 45-second slot, three 15-second digital components may be selected and provided, instead of one 45-second digital component or one 30-second digital component and one 15-second digital component. Other existing techniques of selection and provision of digital components for slots with longer duration tends to favor digital components with longer duration. As a result, such existing techniques disproportionately favor selection of digital components of shorter or longer duration relative to other digital components. In contrast, the techniques and methods described in this document allows for equal/proportionate selection of digital components of different durations.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
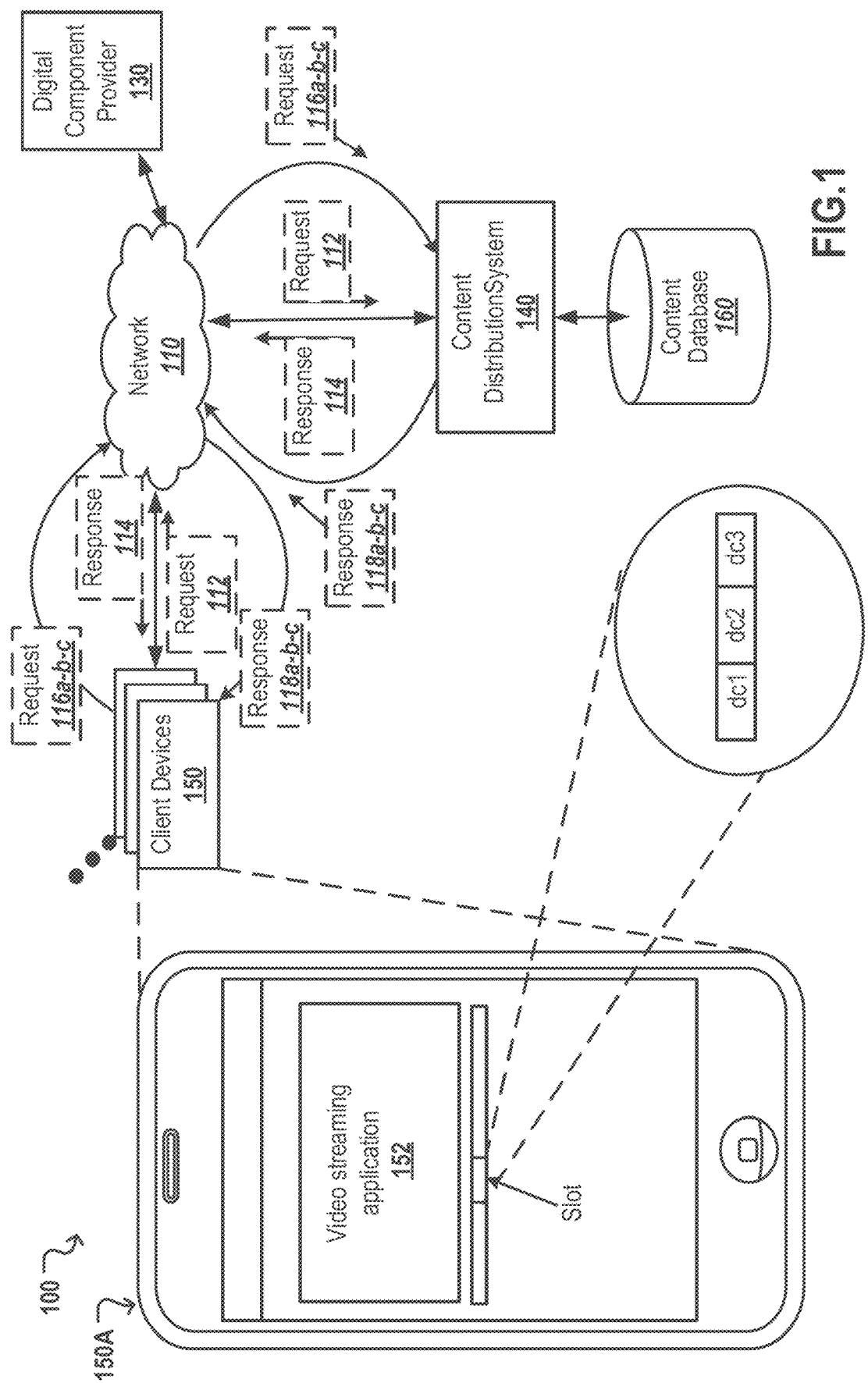
FIG. 1 is an example environment in which digital content and digital components are distributed and presented to a client device.

Client devices (e.g., smart phones, tablet, and personal computers) connected to the internet can be provided content by a content distribution system (e.g., a search platform, a social media platform, or another platform that hosts digital contents). This content can include slots that pause, or otherwise halt, presentation/display/streaming of the content for a period of time so that digital components, not originally included in the content, can be presented to the user of the client device. As used throughout this document, the phrase "digital component" refers to a discrete unit of digital content or digital information (e.g., a video clip, audio clip, multimedia clip, image, text, or another unit of content). Generally, digital components are separate from the content, and are selected for presentation based on the context in which the content are being played (e.g., day, time, user characteristics, and device characteristics). For example, digital components can be selected by, and provided by, a different system (e.g., a digital component system) than the system that provides the digital content. Furthermore, the digital components are generally created by an entity other than the entity that created the content and therefore, are considered third party content relative to the content.

To facilitate presentation of a digital component during presentation of digital content, the content includes (or references) a sequence of slots that have been generated for the content. Slots specify timestamps within the duration of the content where presentation of the content can be halted, and where digital components can be provided. For example, assume that the user is using the client device to watch a particular video provided by the content distribution system as a streaming service. Also assume that the duration of the particular video that is being presented on the client device is ten minutes and that the particular video includes a slot at 5 minutes from the beginning of the particular video. In such implementations, the application that is presenting the particular video can determine that a slot is located at the five minute presentation point within the video. Based on this determination, the application can pause (or otherwise halt) presentation of the particular video when playback reaches the five minute mark, and present the digital component that is provided by the digital component system while playback of the particular video is halted. After presentation of the digital component (or at an end of the slot duration), the application resumes presentation of the particular video. Slots can further specify constraints including a maximum number of digital components that can be provided within the slot and/or a maximum total duration specifying the total time allotted to the digital components provided within the slot. For example, if a slot specifies that a maximum of three digital components can be provided within the slot, then no more than three digital components can be displayed by the slot in succession. In another example, if a slot specifies that a maximum total duration of the slot is 45 seconds, then any number of digital components can be selected for display within the slot until and unless the sum of the durations of all the selected digital components is less than or equal to 45 seconds. As another example, if a slot specifies both the constraints such as a maximum of three digital components can be provided within the slot and that the maximum total duration of the slot is 45 seconds, then no more than three digital components can be displayed by the slot in succession and up to three digital components can be selected such that the sum of the durations of the three digital components is less than or equal to 45 seconds.

Depending on the particular implementation, there can be one or more slots for presenting digital components. In one example implementation, a slot can accommodate a single digital component however in other implementations, a slot can accommodate more than one digital components.

Digital components can be of varying durations. As described above, existing techniques of selecting digital components for delivery to the client devices generally maximize the total number of digital components that can be presented on the client device during a slot, which results in a disproportionate selection of digital components of shorter durations (relative to other digital components of longer durations). Other existing techniques that try to select digital components with longer durations and do not try and maximize the total number of digital components results in a disproportionate selection of digital components of longer durations. Either way, the existing selection strategies result in a bias towards selecting digital components with certain durations. In contrast, techniques and methods described in this document enable an equal/proportionate selection of digital components of different durations for display within a slot included in a particular content. The techniques described herein accomplish this by selecting digital components based, not only on the duration of the digital components, but other attributes related to the constraints imposed by the digital components as well as the constraints imposed by the slot within which the digital components are to be provided. In some implementations, and as described in greater detail in this document, the techniques described in this document generate a score for each digital component in a set of digital components based on various factors related to the slot, such as (1) a maximum number of digital components that can be provided in slot and (2) a total duration of the slot, as well as factors related to the digital component, such as (1) a duration of the digital component, (2) a position requirement for the digital component that specifies whether the digital component is required to be provided in a particular position from among the available positions in the slot, (3) a number of times that the digital can be provided within the slot, (4) a type of the digital component (for e.g., video or audio digital components), and (5) a priority of the digital component indicating an importance of presenting the digital component on the client device. The resulting score for each digital component represents a likelihood of whether provision of the digital component within the slot maintains proportionate and equitable distribution of digital components of different durations. For example, a higher score for a digital component indicates that distribution of a digital component is more likely to result in proportionate/equitable distribution of digital components, while a lower score for a digital component indicates that distribution of a digital component is less likely to result in proportionate/equitable distribution of digital components.

Based on the scores generated for the digital components in the set of digital components, one or more digital components (e.g., those with the highest scores) are selected and provided for display during a slot included in content being presented on the client devices. For example, a slot can accommodate different combinations (or set) of digital components of varying durations. Each of the different combinations of digital components can have a total score based on the scores of digital components (e.g., sum of the scores of the digital components) that are included in each combination. In some implementations, the combination with the highest total score (also referred to as a global score) is selected for the slot.

These features and additional features are further described below with reference to FIGS. 1-4.

FIG. 1 is an example environment 100 in which digital content and digital components are distributed and presented to a client device. The example environment 100 includes a network 110. The network 110 can include a local area network (LAN), a wide area network (WAN), the Internet or a combination thereof. The network 110 can also include any type of wired and/or wireless network, satellite networks, cable networks, Wi-Fi networks, mobile communications networks (e.g., 3G, 4G, 5G, and so forth) or any combination thereof. The network 110 can utilize communications protocols, including packet-based and/or datagram-based protocols such as internet protocol (IP), transmission control protocol (TCP), user datagram protocol (UDP), or other types of protocols. The network 110 can further include a number of devices that facilitate network communications and/or form a hardware basis for the networks, such as switches, routers, gateways, access points, firewalls, base stations, repeaters or a combination thereof. The network 110 connects client devices 150, a content database 160 and a content distribution system 140.

A client device 150 is an electronic device that is capable of requesting and receiving resources over the network 110. Example client devices 150 include personal computers, tablet devices, wearable devices, digital assistant devices (e.g., smart speakers), mobile communication devices, and other devices that can send and receive data over the network 110. A client device 150 typically includes a user application, such as a web browser, to facilitate the sending and receiving of data over the network 110, but native applications executed by the client device 150 can also facilitate the sending and receiving of data over the network 110. For example, client device 150A is an example smartphone device executing a video streaming application 152. In some implementations, the input accepted by the client devices 150 include audio (e.g., voice) input that is received through a microphone of the client device. Similarly, the output provided by the client devices 150 can be audio (e.g., synthesized speech) output that is presented using a speaker that is part of the client device.

Client devices 150 generate content requests 112, which are transmitted over the network 110 to the content distribution system 140. For example, the client device 150A can generate the content request 112 in the form of a packetized data request including a header and payload data. The content request 112 can include event data specifying features, such as a name (or network location) of a server from which content is being requested, a name (or network location) of the requesting device (e.g., the client device 150), and/or information that the content distribution system 140 can use to select one or more contents provided in response to the request. The content request 112 is transmitted, by the client device 150, over the network 110 (e.g., a telecommunications network) to a server of the content distribution system 140.

Content requests 112 can include event data related to other information, such as information that a user of the client device has provided, geographic information indicating a state or region from which the content request 112 was submitted, or other information that provides context for the environment in which the requested content will be displayed (e.g., a time of day of the component request, a day of the week of the component request, a type of device at which the requested content will be displayed, such as a mobile device or tablet device). Content requests 112 can be transmitted, for example, over a packetized network, and the content requests 112 themselves can be formatted as packetized data having a header and payload data. The header can specify a destination of the packet and the payload data can include any of the information discussed above.

The content distribution system 140, selects content (e.g., a video or an audio) from the content database 160 that will be provided to the client device 150 in response to receiving the content request 112 and/or using information included in the content request 112. In some implementations, the content database 160 includes millions of available content that are indexed. Each index entry can reference the corresponding content and specify one or more slots that have been defined for that corresponding content, where each slot is a location within the content at which one or more digital components can be provided. In some implementations, each index entry can also include data specifying the attributes of each of the one or more slots of the particular content. For example, an index entry can specify one or more slots, the time stamps of each of the one or more slots (which specifies, e.g., the time from the beginning of the presentation of the content at which the slot begins and/or the time from the beginning of the presentation of the content at which the slot ends), and a duration of each of the slots (referred to as T). In another example, each index entry can further include a number (referred to as N) of digital components that can be accommodated into each of the one or more slots and one or more position requirements for the one or more slots.

For example, assume that the client device 150A generates a content request 112 for a particular content in the content database 160 that includes a slot for the provision of digital components. The content distribution system 140, after receiving the content request 112, generates a response 114 that includes data required to present the particular content from the content database 160 along with the data specifying attributes of the slot required to present digital components. In some implementations, the response 114 can include the URL (or another resource identifier) of the content in the content database 160 and the attributes of the one or more slots, such as, e.g., the timestamps of each slot, the maximum number of digital components (N) that can be provided sequentially within each of the one or more slots, and the duration of each of the one or more slots (T) and optionally a position requirement for digital components that will be presented during the slot. The response 114 is transmitted over the network 110 to the client device 150A. The client device 150A uses the data received in the response 114 to provide the particular content by rendering the content, for example, via the video streaming application 152 executing on the client device 150A. The client device 150A also uses the data specifying attributes of the slot to present digital components. For example, the data specifying attributes of the slot included in the response 114 defines a slot and the beginning (and/or end) timestamps of the slot. The data can further define the number of digital components that can be provided in the slot is three i.e. N=3. The data can further defines that the duration T of the slot is 60 seconds, i.e., T=60 seconds.

In some implementations, the client device 150A, after receiving the response 114, generates a request for digital components based on the data specifying attributes of the slots to provide digital components. Depending on the particular implementation, the client device can either generate a single request for N digital components or generate N requests for a single digital component. Continuing with the above example, the client device 150A generates three separate requests 116a, 116b and 116c for digital components to be provided during the slot. The content distribution system 140, after receiving each of the requests 116a, 116b and 116c, selects digital component dc1, dc2 and dc3 and generates responses 118a, 118b and 118c respectively such that each response includes a digital component dc1 dc2 and dc3 respectively. The responses 118a, 118b and 118c are transmitted to the client device 150A. The client device 150A halts display of the content at the timestamp of the slot and displays the digital components dc1, dc2 and dc3 that were included in the responses 118a, 118b, and 118c in a sequence. Alternatively, N digital components or resource identifiers (e.g., URLs) for N digital components can be provided along with the response 114, such that no separate requests 116 and responses 118 need to be generated. This has the advantage of reducing the bandwidth and resources necessary for the additional network communication required for requests 116 and responses 118.

In some implementations, digital components can be characterized by different attributes, such as a duration of the digital component, a priority of the digital components. For example, digital component provider 130 can provide and/or generate digital components of different durations that can vary based on the context of the digital component or the digital component distribution strategy. For example, digital components can be of durations 15 seconds, 30 seconds or 40 seconds.

In some implementations, each digital component has an associated priority p signifying the importance of delivery and presentation of the digital component on the client device. In some implementations, the priority of the digital components is set by the digital component provider 130. For example, a digital component provider 130 can start a campaign for promoting a particular product. To promote the campaign, the digital component provider 130 can provide multiple digital components that are contextually related to the particular product. To promote the campaign quickly, the digital component provider 130 can assign a priority to the digital components of the campaign. In another example, the digital component provider 130 can assign priorities for certain types of digital components. For example, the digital component provider 130 can assign a higher priority to video based digital components when compared to audio based digital components. In some implementations, the content distribution system 140 after receiving the priority associated to each digital component, selects digital components based on the priority for delivery to the client devices. In some implementations, the content distribution system 140 can compute the priority of each digital components. For example, the content distribution system 140 can set the priority of the digital components based on a monetary value paid by the digital component provider 130 to the content distribution system 140. In another example, the content distribution system 130 can prioritize selection and delivery of digital components based on the context of digital components. For example, digital components that are contextually related to the digital content accessed by the user of the client device can be assigned a higher priority compared to other digital components. In such implementations, the content distribution system 140 selects, or provides higher weight to (for selection purposes), digital components for distribution that have a higher priority. For example, assume that there are two types of digital components where digital components of the first type have a higher priority compared to the digital components of the second type. Since the content distribution system 140 selects (or weighs the selection of) digital components based on priority, the content distribution system 140 is more likely to select digital components of the first type for distribution compared to the digital components of the second type.

While displaying digital components on the client device, the content distribution system 140 and the digital component provider 130 may wish to have a fair selection of digital components for delivery and display on client devices. For example, assume that a slot has a duration of 45 seconds, i.e., T=45 seconds and the total number of digital components that can be included in the slot is 3, i.e., N=3. Further assume that the content distribution system 140 has an inventory of digital components of durations 15, 30 and 40 seconds. Assuming for a moment that other factors, such as priority, are not considered for selection of digital components, the following table 1 shows the possible selection configurations for the digital components that are to be provided for presentation in the slot.

TABLE 1

| Index | Valid Allocation |
|---|---|
| 1 | 1 component of 40 s duration |
| 2 | 1 component of 30 s duration |
| 3 | 3 components, each of 15 s duration |
| 4 | 2 components, one of 30 s duration and another of 15 s duration |

Table 1 shows that a slot of a duration of 45 seconds can accommodate digital components of different durations where each row of the table represents a combination of digital components selected for the slot. For example, the content distribution system 140 can (1) select a single digital component with a duration of 40 seconds, (2) select a single digital component with a duration of 30 seconds, (3) select three digital components of duration of 15 seconds, or (4) select two digital components such that the first of the two digital components has a duration of 15 seconds and the second of the two digital components has a duration of 30 seconds.

As described above, existing techniques of selecting digital components seek to either maximize the number of digital components that can be presented during a slot or seeks to maximize selection of digital components with longer duration. Either way, the selection strategy results in a disproportionate/inequitable selection of digital components of shorter duration or longer durations respectively. The techniques and methods explained further in this document with reference to FIGS. 2 and 3 helps mitigate the problem discussed above.

Figure 2:
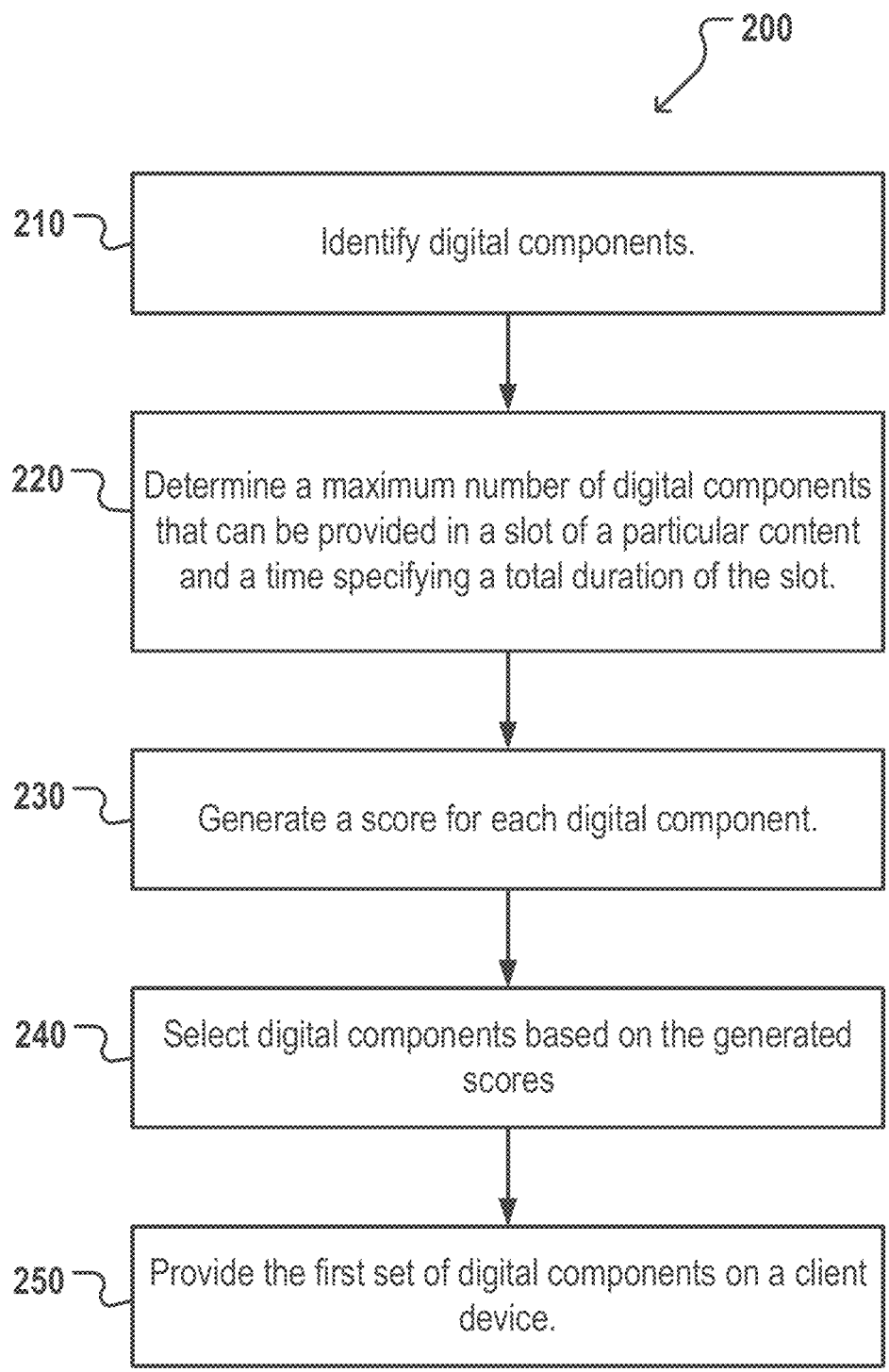
FIG. 2 is a flow chart of an example process for selecting digital components.

FIG. 2 is a flow diagram of an example process 200 for fair selection of digital components. Operations of the process 200 can be implemented, for example, by the content distribution system 140 to select digital components for presentation on the client device. Operations of the process 200 can also be implemented as instructions stored on a computer readable medium, where execution of the instructions can cause one or more data processing apparatus to perform operations of the process 200.

Even though the process 200 is explained below with reference to providing digital components that will be displayed sequentially in a particular slot, the techniques and methods presented in this document can be implemented to provide digital components for presentation within multiple slots (that may or may not be sequential).

A plurality of digital components are identified (210). The digital component provider 130 provides a plurality digital components for distribution and display on the client devices. The content distribution system 140 that distributes digital components to client devices 150, can receive the plurality of digital components from multiple digital component providers 130 for distribution to the client devices as and when deemed suitable. In some implementations, the content distribution system 140 can have access to a catalog/inventory (or a list) of digital components of different digital component providers 130 that can be provided to the client devices. For example, the content distribution system 140 can maintain, for each digital component provider 130, a list of digital components that have been identified by the component provider 130 and the corresponding resource locations/URLs for the digital components.

The content distribution system 140 determines a maximum number of digital components N that can be provided for display within a slot of particular content and a total time T specifying a total duration of the N available slots (220). In some implementations (and as described above with reference to FIG. 1), for the particular content that is to be provided for display on client device 150, the content distribution system 140 access the index entry corresponding to the particular content (which is described above with reference to FIG. 1), which provides attributes/parameters of the one or more slots that have been defined for the particular content. The content distribution system 140 thus determines, based on accessing the index entry, the attributes for the particular slot, including the maximum number of digital components N that can be provided for presentation within a slot of the particular content, the duration (T) of the slot and one or more position requirements for the slot.

The content distribution system 140 generates a score for each of the plurality of digital components (230). In some implementations, the content distribution system 140 generates a score for each of the plurality of digital components that maintains a proportionate and equitable distribution of digital components of different properties such as duration of the digital components, context of digital components or type of digital components (for e.g., audio or video only digital components). The scores are based on (i) a duration of the digital component, (ii) a priority of the digital component as determined by the content distribution system, (iii) a satisfaction ratio of the digital component, (iv) a position requirement of the digital component, (v) a number of times the digital component can be placed in the slot, given the constraints. The score for each digital component represent a likelihood of whether the digital component will appear in the slot. A higher score, relative to other available digital components, indicates a higher likelihood that the digital component will appear in the slot. A lower score, relative to other available digital components, indicates a lower likelihood that the digital component will appear. The generation of the score for each digital component is further described below with reference to FIG. 3.

The content distribution system 140 selects a first set of digital components based on the generated scores (240). In some implementations, based on the generated scores for each of the plurality of digital components, the content distribution system 140 selects a first set of digital components that have the highest scores compared to the rest of the digital components. For example, assume that the digital component provider 140 has one hundred digital components from which the content distribution system 140 selects and distributes digital components to the client devices. For each of the hundred digital components, the content distribution system 130 generates a score and selects one or more digital components (referred to as the first set of digital components) that have the highest scores.

In some implementations, the content distribution system 140 selects the first set of digital components using a selection process that maximizes the global score calculated by summing the individual scores of each of the selected digital components in the first set. The selection process can include one or more constraints. For example, the selection process can select digital components such that the total duration of the selected digital components is less than or equal to the duration of slot so that the time duration required to display the selected digital components in succession does not exceed the slot duration. In another example, the selection process can select digital components in a manner that meets the position requirement of the each selected digital component.

Another approach of selecting the first set of digital components for a slot is selecting multiple sets of digital components based on constraints such as the position requirement, maximum duration of the slot, and the time duration of the digital components. Once there are multiple sets of digital components, the content distribution system 140 can compute the total score of each of the sets of digital components based on scores of digital components that make up those sets. Finally, the content distribution system 140 can select the set of digital components as the first set that has the highest global score among the multiple sets of digital components. For example, the content distribution system 140 can implement a brute force approach to generate all possible combinations of digital components based on the one or more constraints and the position requirements. The content distribution system 140 can then generate global scores for each of the combinations of digital components and select a combination as the first set that has the highest global score.

In some implementations, the cardinality of the first set of digital components is determined by the total duration of each of the digital components that is selected based on the scores and the duration of the slot during which the selected digital components is going to be presented on the client device. For example, assume that the duration of a slot while presenting a content on the client device is 60 seconds. The content distribution system 140 selects a digital component (e.g., dc1) with the highest generated score that has a duration of 40 seconds. While selecting another digital component, the content distribution system 140 can calculate the duration of the slot remaining after presentation of digital component dc1 which in this case is 20 seconds. The content distribution system 140 can then select digital components that have the second highest score and that can be accommodated within the remaining time of the slot or generate scores of new digital components and select a digital component from the newly generated scores and the scores of the previously generated scores until the max number of digital components have been selected for the slot.

The content distribution system 140 provides the first set of digital components to the client device (250). After selecting the first set of digital components based on the generated scores, the content distribution system generates responses for each of the request for digital components from the client device that each includes a selected digital component for presentation on the client device. For example, the content distribution system 140, after receiving each of the requests 116a, 116b and 116c, selects digital component dc1, dc2 and dc3 and generates responses 118a, 118b and 118c such that each response includes a digital component dc1 dc2 and dc3 respectively. The responses 118a, 118b and 118c are transmitted to the client device 150A, where they are displayed within the slot during presentation of the particular content.

In some implementations, the content distribution system 140, after receiving N requests for digital components can select less than N digital components. For example, the content distribution system 140, after receiving each of the requests 116a, 116b and 116c, selects digital component dc1 and dc2 and generates two responses 118a and 118b that includes dc1 and dc2 respectively. It should be noted that the maximum number of digital components (N) is considered as an upper limit and that no more than N digital components can be presented in the slot (and fewer than N digital components can be presented in the slot).

Figure 3:
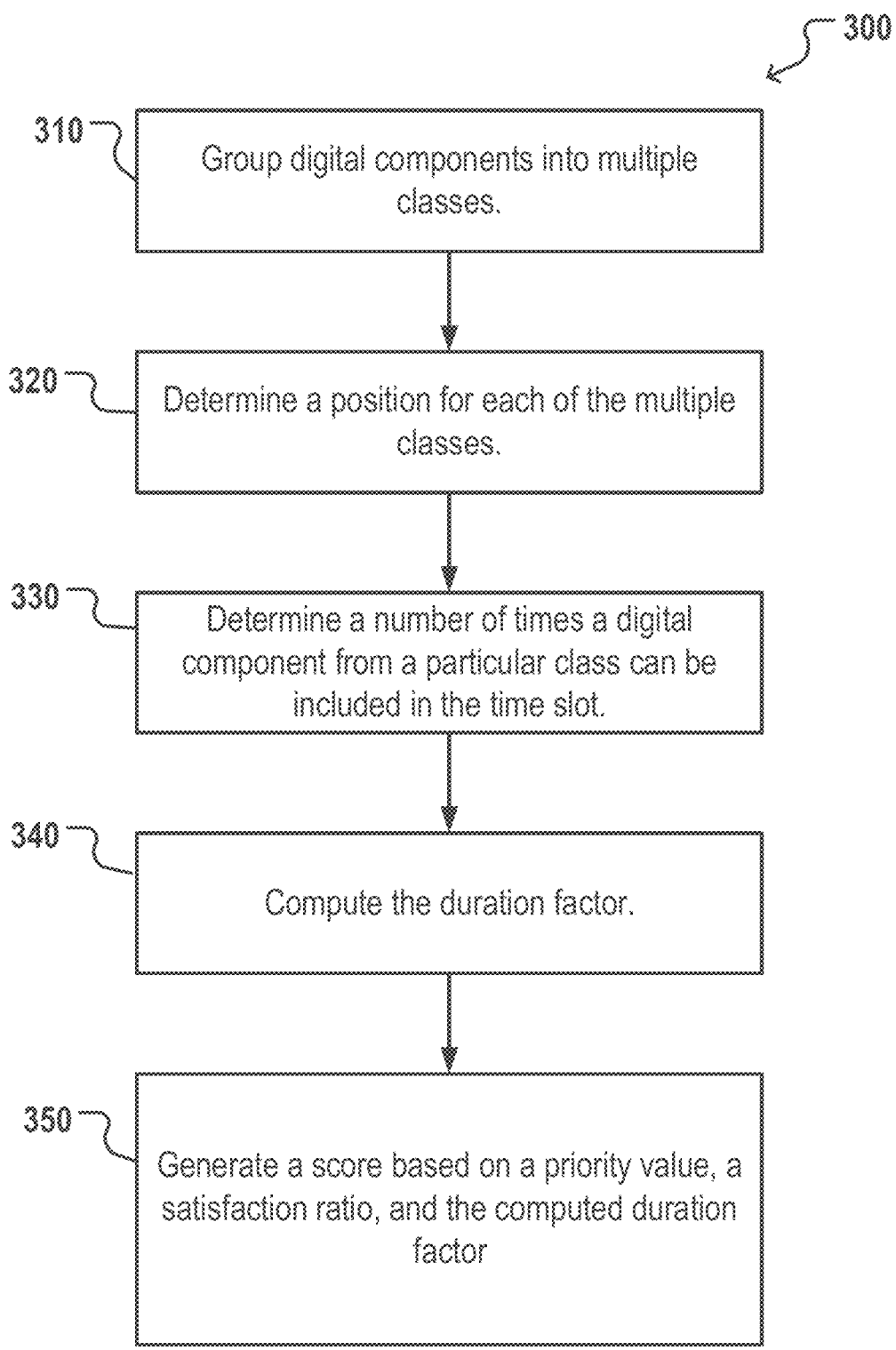
FIG. 3 is a flow chart of an example process for generating a duration factor.

FIG. 3 is a flow diagram of an example process of generating a score for each of the plurality of digital components, as described with reference to operation 230 in FIG. 2. Operations of the process 300 can be implemented, for example, by the content distribution system 140 to select digital components for presentation on the client device. Operations of the process 300 can also be implemented as instructions stored on a computer readable medium, where execution of the instructions can cause one or more data processing apparatus to perform operations of the process 300.

The content distribution system 140 groups digital components into multiple classes (310). In some implementations, the content distribution system 140 groups digital components into multiple classes based on the duration of each of the digital components. As described with reference to FIGS. 1 and 2, the digital component provider 130 can create and make available a plurality of digital components to the content distribution system 140 for delivery/provision of the digital components to the client devices. For example, the digital components can be of three lengths such as 15, 30, and 45 seconds. Accordingly, the content distribution system 140 can generate three groups/classes of digital components: one for digital components with a duration of 15 seconds, another for digital components with a duration of 30 seconds, and another for digital components with a duration of 45 seconds.

In some implementations, the content distribution system 140 can group digital components into multiple classes based on certain criteria that is defined in terms of duration of the digital components. In some implementations, the criteria can be based on the level of granularity set by the designer and/or the user of the system. For example, eligibility criteria of finely tuned classes can define a class that can include all digital components that have a duration between 20-25 seconds i.e. more than 20 seconds and less than 25 seconds. Comparatively, a coarse classification can define a class that can include all digital components that have a duration between 15-30 seconds, i.e., more than 15 seconds but less than 30 seconds.

The content distribution system 140 determines the position requirements of each of the multiple classes (320). In some implementations the digital component provider 130 may wish to place certain digital components in certain locations with respect to other digital components within a slot. For example, assume that a digital component provider 130 provides digital components that belongs to two classes: (i) class of digital components with a duration of 15 seconds (referred to as class A), and (ii) class of digital components with a duration of 30 seconds (referred to as class B). If the digital component provider 130 wants digital components belonging to class B to be presented on the client device 110 in a position that is neither the first or the last position of digital components in the slot, the digital component provider 130 asserts a position requirement. In another example, the position requirement for a digital component can be generated by the content distribution system 130 based on the characteristics of the digital components and the digital content accessed by the user of the client device. For example, assume that the content distribution system 130 selects four digital components for delivery and display on the client device based on the context of the digital content accessed by the user. The content distribution system 130 can further determine that two out of the four digital components when presented in sequence has a greater significance to the user compared to the two digital components are presented separately, thus generating a position requirement for the digital components.

In yet another example, position requirement for digital components within the slots can be based on how the content distribution system 130 acquires digital components for a slot. For example, a content distribution system 130 can specify that the first digital component that is to be displayed in the slot with T=45 seconds and N=3 has to be acquired through a real time bidding process such as an auction. Assume that the digital component selected via such a bidding process has a time duration of 30 seconds. In such a situation, the position requirement for the 30 second digital component is that it has to be displayed first.

In some implementations, the digital component provider 130 can allow the content distribution system 140 to access the catalog/inventory that holds the digital components, the respective position requirements of each of the digital components along with other attributes of the respective digital components. The content distribution system 140 while generating scores for the digital components can access the catalog/inventory to access the respective position requirement of the digital components. The content distribution system determines a number of times a digital component from a particular class can be included in the slot (330). In some implementations, the content distribution system 140 determines the number of times a digital component from a particular class can be included in a slot based on (i) the maximum number of digital components N that can be provided in a slot, (ii) the time T specifying the a total duration of the slots, and (iii) the position requirement for the class. This is illustrated using the following examples.

For example, assume that a slot has a duration of 60 seconds (T=60 seconds) and can accommodate a maximum of 3 digital components (N=3). Also assume that the digital components that are available for the slot belong to two classes of digital components: (i) class of digital components with a duration of 15 seconds (referred to as class A), and (ii) class of digital components with a duration of 30 seconds (referred to as class B). Further assume that the digital component provider 130 has a position requirement of class B that specifies that the digital components from class B cannot be placed as the first or the last digital component in the slot. In such a situation, the content distribution system 140 can select digital components in the following order:

| Position 1 | Position 2 | Position 3 |
|---|---|---|
| Digital component from class A | Digital component from class B | Digital component from class A |

In the above example, digital components are selected based on the position requirements for the class B. In this example, the content distribution system 140 determines that one digital component from class B can be included in the slot (e.g., in the second position) and two digital components from class A can be included in the slot (e.g., in the first and third positions).

In another example, assume that a slot has a duration 75 seconds (T=75 seconds) and can accommodate a maximum of 3 digital components (N=3). Also assume that the digital components that are available for the slot belong to two classes of digital components: (i) class of digital components with a duration of 15 seconds (referred to as class A), and (ii) class of digital components with a duration of 30 seconds (referred to as class B). Further assume that the digital component provider 130 has a position requirement of class B that specifies that the digital components from class B cannot be placed as the first digital component in the slot. In such a situation, the content distribution system 140 can select digital components in the following order:

| Position 1 | Position 2 | Position 3 |
|---|---|---|
| Digital component from class A | Digital component from class B | Digital component from class B |

In this example, digital components are selected based on the position requirements for the class B. In this example, the content distribution system 140 determines that two digital component from class B can be included in the slot (e.g., in the second and the third positions) and one digital components from class A can be included in the slot (e.g., in the first positions)

The content distribution system 140 computes the duration factor (340). In some implementations, the content distribution system 140 computes the duration factor of each digital components as the reciprocal of the number of times a digital component from a particular class can be included in the slot (as determined in operation 140 above). Continuing from the above example, where digital components from class B can be included in the slot in the second and the third positions thereby including digital component from class B two times, the duration factor of digital components in class B is ½. Similarly, the duration factor for digital components in class A is 1 (since components from class A can only be selected 1 time and reciprocal of 1 is 1).

The content distribution system 140 generates a score for each digital component in the plurality of digital components based on a priority value, a satisfaction ratio, and the computed duration factor for the class to which the digital component belongs (350). In some implementations, a priority value is determined by a content provider system 140 for each digital component or each class of digital components (as described above with reference to FIGS. 1 and 2). In some implementations, a satisfaction ratio represents a number of digital components of a particular duration that have previously been provided to client devices relative to a total number of digital components of the particular duration that are available for provision to client devices. In some implementations, the satisfaction ratio is computed for each class of digital components, as further described below.

For each class, the content distribution system 140 determines a target number of digital components of the class that are to be provided to client devices. For example, assume that the content distribution system 140 has 100 digital components for distribution such that there are 50 digital components that belong to class A of digital components with a duration of 15 seconds and other 50 digital components that belong to class B of digital components with a duration of 30 seconds. In this example, the content distribution system 140 determines that the target number of digital components of class A that are to be provided to client devices is 50 and the target number of digital components of class B that are to be provided to client devices is 50.

For each class, the content distribution system 140 determines a number of digital components that have previously been provided to client devices. In some implementations, the content distribution system 140 maintains a number of digital components of each class that have previously been provided to client devices (e.g., by incrementing a counter for each class with each provision of a digital components of the class). In such implementations, the content distribution system determines a number of digital components that have previously been provided to client devices by accessing the value of the counter for the particular class. For example, assume that the content distribution system 140 has already selected and delivered 40 digital components from class A and 15 digital components from class B to the client devices 150. In this example, the content distribution system 140 determines a number of digital components of class A that have previously been provided to client devices is 40 and a number of digital components of class B that have previously been provided to client devices is 15. In this example, number of digital components that are yet to be provided is 10 for class A and 35 for class B. The content distribution system 140 computes the satisfaction ratio using (i) the number of digital components of a class that have been already delivered to the client devices and have been displayed, and (ii) the target number of digital components of the class, as shown below:

$$\text{satisfaction ratio}_{class} = (\text{number of digital components delivered})_{class} / $$
$$(\text{target number of digital components})_{class}$$

Depending on the implementation, the satisfaction ratios can be a fraction or a percentage or any other representation based on the number of digital components of a class and the target number of digital components of the class. In some implementations, the satisfaction ratio can be based on the number of digital component delivered to the client devices over a particular duration. In such implementations, the satisfaction ratio can be based on (i) the number of digital components delivered irrespective of the class of digital components in a period of time, and (ii) the expected number of digital components that should have been delivered irrespective of the class of digital components in the same period of time. For example, assuming the number ($X_{delivered}$) of digital components is delivered to the client device irrespective of the class of digital components in a period of time t and the expected number ($X_{expected}$) of digital components that should have been delivered irrespective of the class of digital components in the same period of time t, the satisfaction be ratio can represented as $$\text{satisfaction ratio} = (X_{delivered} * t) / (X_{expected} * t)$$

The content distribution system generates the score for each digital component based on (i) the priority value, (ii) the satisfaction ratio, and (iii) the computed duration factor for the class to which the digital component belongs. This can be represented using the following equation:

$$V(p, d, s) = F(p)G(d)H(s)$$

where the function V is parameterized by priority p of the digital component, the duration factor d and a satisfaction ratio r. The functions F, G and H can be functions that map their respective inputs i.e., p, d and s and generates values for each of their respective inputs that can be used to generate scores. For example, the function G can be a function that characterizes digital components based on the class of the digital components to promote an equitable distribution of digital components across multiple classes. As mentioned previously with reference to step 310 of the process 300, the class of the digital component is based on the duration of the digital component. However, depending upon the particular implementation, the class can be based on one or more features such as priority, position factor, satisfaction ratio, and/or the context of the digital components. The function F and H can be functions that manipulate the priority p and satisfaction ratio s of a digital component into a space of values linearly or non-linearly such that the generated values of functions F and H can promote an equitable distribution of the digital components. For example, if the function F is directly proportional to the priority p, then the value generated by function F is comparatively higher for digital components with high priority when compared to the value generated by function F for digital components with lower priority. As for another example, the function H can generate a value greater than 0.5 if according to the satisfaction ratio s the delivery of the digital components is lagging behind the expected number of digital components that were to be delivered. Similarly, the function H can generate a value less than 0.5 if according to the satisfaction ratio s, more number of digital components have been delivered than the expected number of digital components. In some implementations, the functions F, G, and H while computing the respective generated values can consider the constraints imposed by the duration of slot, the duration of the digital components and the position requirement of the digital components.

In some implementations, these functions can be further parametrized and/or defined using learnable parameters. For example, the functions F, G, and H can be machine learning models that can learn the learnable parameters via training by adjusting the values of the learnable parameters. For example, the functions G can be a machine learning model configured to receive as input the duration factor d and generate a predicted value that can be used to calculate the score of the digital component. These functions can be determined and altered by the system designer.

Figure 4:
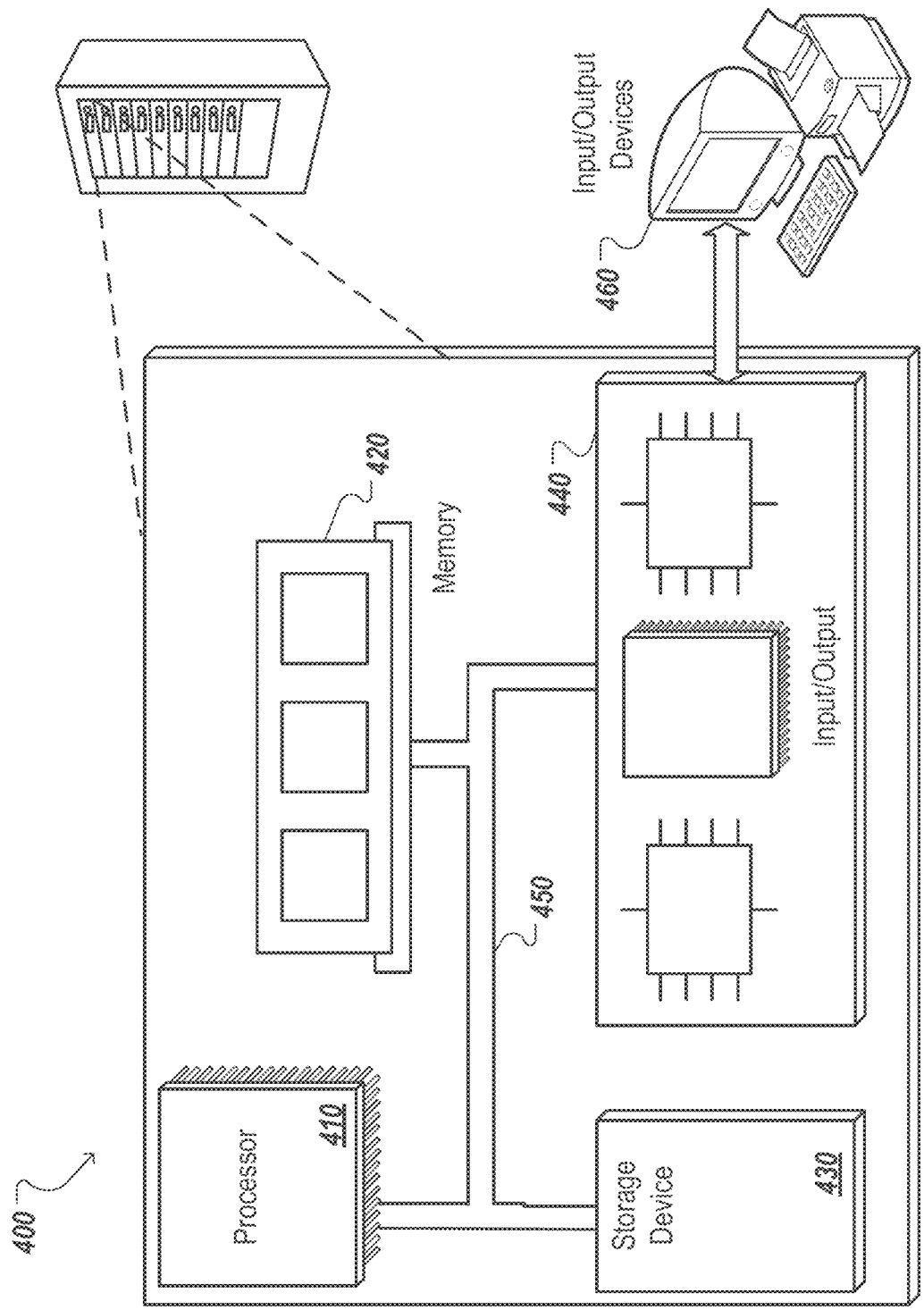
FIG. 4 is a block diagram of an example computer system that can be used to perform operations described.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying a plurality of digital components;
identifying a slot within a particular content at which one or more digital components can be provided;
for each digital component in the plurality of digital components, generating a score based on (i) a duration of the digital component and (ii) a position requirement for the digital component that specifies where the digital component can be provided in the slot;
selecting, based on the scores for the plurality of digital components, a first set of digital components for provision within the slot; and
providing the first set of digital components within the slot during display of the particular content on a client device.

2. The computer-implemented method of claim 1, wherein identifying the slot within particular content at which one or more digital components can be provided, comprises:
determining (i) a maximum number of digital components N that can be provided in the slot and (ii) a time T specifying a total duration of the slot.

3. The computer-implemented method of claim 2, wherein the position requirement specifies where, among M available positions in the slot, the digital component can be provided, and wherein each available position among the M available positions spans a particular duration of the particular content and within which a single digital component can be provided.

4. The computer-implemented method of claim 3, wherein generating the score is further based on at least one of: (i) a number of times that the digital component is available for provision within the slot, (ii) a priority value that is assigned to the digital component, wherein the priority value signifies an importance of providing the digital component to the client device, or (iii) a satisfaction ratio that represents a number of digital components of a particular duration that have previously been provided for display to client devices relative to a total number of digital components that are available for provision to client devices.

5. The computer-implemented method of claim 1, wherein selecting the first set of digital components comprises selecting, from the plurality of digital components and based on the scores for the plurality of digital components, a first set of digital components having a set of highest scores for provision within the slot.

6. The computer-implemented method of claim 4, wherein the number of times that the digital component is available for provision within the slot is based on (i) the maximum number of digital components N, (ii) the time T specifying the total duration of the slot, and (iii) the position requirement for the digital component.

7. The computer-implemented method of claim 4, wherein generating the score comprises:
grouping digital components into multiple classes based on the duration of the digital components;
determining a position requirement for each of the multiple classes, wherein the position requirement for each class specifies a particular position of the slot at which a digital component of the class is to be provided for display;
determining, for each class and based on (i) the maximum number of digital components N that can be provided in a slot, (ii) the time T specifying the total duration of the slots, and (iii) the position requirement for the class, a number of times a digital component from each class can be provided for display within the slot;
computing a duration factor for each class as a reciprocal of the number of times a digital component from the class can be included in the slot; and
generating the score for each digital component in the plurality of digital components based on (i) the priority value, (ii) the satisfaction ratio, and (iii) the computed duration factor for the class to which the digital component belongs.

8. The computer-implemented method of claim 4, wherein the M available positions includes M sequential positions and wherein generating the satisfaction ratio, including:
identifying a plurality of classes of digital components of different durations, wherein each class represent a group of digital components of a particular duration;

for each class:
  determining a target number of digital components that are to be provided to client devices;
  determining a number of digital components that have previously been provided for display to client devices;
  computing a ratio based on the target number and the number of digital components that have previously been provided for display to client devices; and
generating the satisfaction ratio based on the computed ratios for the plurality of classes.

9. A system, comprising:
one or more data processing apparatus; and
at least one memory coupled to the one or more data processing apparatus and storing one or more programming instructions that, when executed by the one or more data processing apparatus, perform operations comprising:
  identifying a plurality of digital components;
  identifying a slot within a particular content at which one or more digital components can be provided;
  for each digital component in the plurality of digital components, generating a score based on (i) a duration of the digital component and (ii) a position requirement for the digital component that specifies where the digital component can be provided in the slot;
  selecting, based on the scores for the plurality of digital components, a first set of digital components for provision within the slot; and
  providing the first set of digital components within the slot during display of the particular content on a client device.

10. The system of claim 9, wherein identifying the slot within particular content at which one or more digital components can be provided, comprises:
  determining (i) a maximum number of digital components N that can be provided in the slot and (ii) a time T specifying a total duration of the slot.

11. The system of claim 9, wherein the position requirement specifies where, among M available positions in the slot, the digital component can be provided, and wherein each available position among the M available positions spans a particular duration of the particular content and within which a single digital component can be provided.

12. The system of claim 11, wherein generating the score is further based on at least one of: (i) a number of times that the digital component is available for provision within the slot, (ii) a priority value that is assigned to the digital component, wherein the priority value signifies an importance of providing the digital component to the client device, or (iii) a satisfaction ratio that represents a number of digital components of a particular duration that have previously been provided for display to client devices relative to a total number of digital components that are available for provision to client devices.

13. The system of claim 9, wherein selecting the first set of digital components comprises selecting, from the plurality of digital components and based on the scores for the plurality of digital components, a first set of digital components having a set of highest scores for provision within the slot.

14. The system of claim 12, wherein the number of times that the digital component is available for provision within the slot is based on (i) the maximum number of digital components N, (ii) the time T specifying the total duration of the slot, and (iii) the position requirement for the digital component.

15. The system of claim 14, wherein generating the score comprises:
  grouping digital components into multiple classes based on the duration of the digital components;
  determining a position requirement for each of the multiple classes, wherein the position requirement for each class specifies a particular position of the slot at which a digital component of the class is to be provided for display;
  determining, for each class and based on (i) the maximum number of digital components N that can be provided in a slot, (ii) the time T specifying the total duration of the slots, and (iii) the position requirement for the class, a number of times a digital component from each class can be provided for display within the slot;
  computing a duration factor for each class as a reciprocal of the number of times a digital component from the class can be included in the slot; and
  generating the score for each digital component in the plurality of digital components based on (i) the priority value, (ii) the satisfaction ratio, and (iii) the computed duration factor for the class to which the digital component belongs.

16. The system of claim 14, wherein the M available positions includes M sequential positions and wherein generating the satisfaction ratio, including:
  identifying a plurality of classes of digital components of different durations, wherein each class represent a group of digital components of a particular duration;
  for each class:
    determining a target number of digital components that are to be provided to client devices;
    determining a number of digital components that have previously been provided for display to client devices;
    computing a ratio based on the target number and the number of digital components that have previously been provided for display to client devices; and
  generating the satisfaction ratio based on the computed ratios for the plurality of classes.

17. A non-transitory computer readable medium storing instructions that, when executed by one or more data processing apparatus, cause the one or more data processing apparatus to perform operations comprising:
  identifying a plurality of digital components;
  identifying a slot within a particular content at which one or more digital components can be provided;
  for each digital component in the plurality of digital components, generating a score based on (i) a duration of the digital component and (ii) a position requirement for the digital component that specifies where the digital component can be provided in the slot;
  selecting, based on the scores for the plurality of digital components, a first set of digital components for provision within the slot; and
  providing the first set of digital components within the slot during display of the particular content on a client device.

18. The non-transitory computer readable medium of claim 17, wherein identifying the slot within particular content at which one or more digital components can be provided, comprises:

determining (i) a maximum number of digital components N that can be provided in the slot and (ii) a time T specifying a total duration of the slot.

19. The non-transitory computer readable medium of claim 18, wherein the position requirement specifies where, among M available positions in the slot, the digital component can be provided, and wherein each available position among the M available positions spans a particular duration of the particular content and within which a single digital component can be provided.

20. The non-transitory computer readable medium of claim 19, wherein generating the score is further based on at least one of: (i) a number of times that the digital component is available for provision within the slot, (ii) a priority value that is assigned to the digital component, wherein the priority value signifies an importance of providing the digital component to the client device, or (iii) a satisfaction ratio that represents a number of digital components of a particular duration that have previously been provided for display to client devices relative to a total number of digital components that are available for provision to client devices.

\* \* \* \* \*